United States Patent [19]

Plier

[11] Patent Number: 4,866,852

[45] Date of Patent: Sep. 19, 1989

[54] AERONAUTIC CHART REMOVABLY ATTACHABLE COURSE AND POSITION LOCATOR

[76] Inventor: Douglas W. Plier, 318 E. Lake St., Horicon, Wis. 53032

[21] Appl. No.: 220,150

[22] Filed: Jul. 28, 1988

Related U.S. Application Data

[63] Continuation-in-part of Ser. No. 903,394, Sep. 2, 1986, abandoned.

[51] Int. Cl.$^4$ .......................... G01C 21/20; B43L 7/06
[52] U.S. Cl. ......................................... 33/431; 33/457; 33/1 MP; 33/1 SD
[58] Field of Search .............. 33/431, 457, 456, 1 MP, 33/1 PT, 1 SD

[56] References Cited

U.S. PATENT DOCUMENTS

| | | | |
|---|---|---|---|
| 1,828,807 | 10/1931 | Kennedy | 33/431 |
| 2,085,059 | 6/1937 | Woodside | 33/431 |
| 2,411,690 | 11/1946 | MacKay | 33/457 |
| 2,419,203 | 4/1947 | Edwards | 33/457 |
| 2,449,342 | 9/1948 | Tardif | 33/431 |
| 2,641,843 | 6/1953 | Hart et al. | 33/431 |
| 2,736,096 | 2/1956 | Greene | 33/431 |
| 2,981,004 | 4/1961 | Edlund | 33/432 |
| 2,996,242 | 8/1961 | Bannister | 33/1 SD |
| 3,059,339 | 10/1962 | Danforth | 33/431 |
| 3,063,626 | 11/1962 | Kritser | 33/431 |
| 3,187,434 | 6/1965 | Casagrande | 33/431 |
| 3,281,942 | 11/1966 | Preuit | 33/457 |
| 3,303,568 | 2/1967 | Geiger | 33/457 |
| 3,387,372 | 6/1968 | Sabadishin | 33/1 MP |
| 3,690,009 | 9/1972 | Henley, III | 33/457 |
| 3,733,708 | 5/1973 | Goodman | 33/1 SD |
| 3,813,783 | 6/1974 | Price | 33/1 SD |
| 3,855,706 | 12/1974 | Price | 33/431 |
| 3,863,347 | 2/1975 | Banner | 33/457 |
| 3,868,777 | 3/1975 | Bell | 33/433 |
| 3,881,253 | 5/1975 | Haws | 33/1 MP |
| 4,095,342 | 6/1978 | Oertli | 33/1 SD |

FOREIGN PATENT DOCUMENTS 381613  10/1932  United Kingdom ................. 33/457

*Primary Examiner*—William A. Cuchlinski, Jr.
*Assistant Examiner*—Diego F. F. Gutierrez

[57] ABSTRACT

An aeronautic chart course and position locator is removably attachable by means of an adhesive backing to an aeronautic chart. The locator is made from a clear supple polymer film and comprises a 360 degree compass rose and a rotatable course and mileage indicator arm attached to the compass rose. The locator may also include a rotatable aircraft heading indicator disk for wind drift correction and course interception and permits course and azimuth identification to or from airports or VHF omni-directional range navigation radial (VOR) transmitters or any other selected point. Two locators can be used together with VOR equipment to locate the position of an aircraft on a chart by simple azimuth triangulation. A third locator can be used to determine the correct course to a point not serviced by directional radio facilities. A modified locator assists a student to visualize the aircraft's position on a chart either to the right or left of a given VOR radial. Another modified embodiment of the invention is used to display aircraft heading and azimuth with respect to one or more non-directional beacons. A pilot can use two of the modified locators with non-directional beacon radial equipment to locate the position of an aircraft on a chart by simple azimuth triangulation. Again, once the position of an aircraft is located, a third locator can be used to determine the correct course to a point not serviced by directional radio facilities. In all instances, the pilot is able to manage navigation using only one hand.

25 Claims, 7 Drawing Sheets

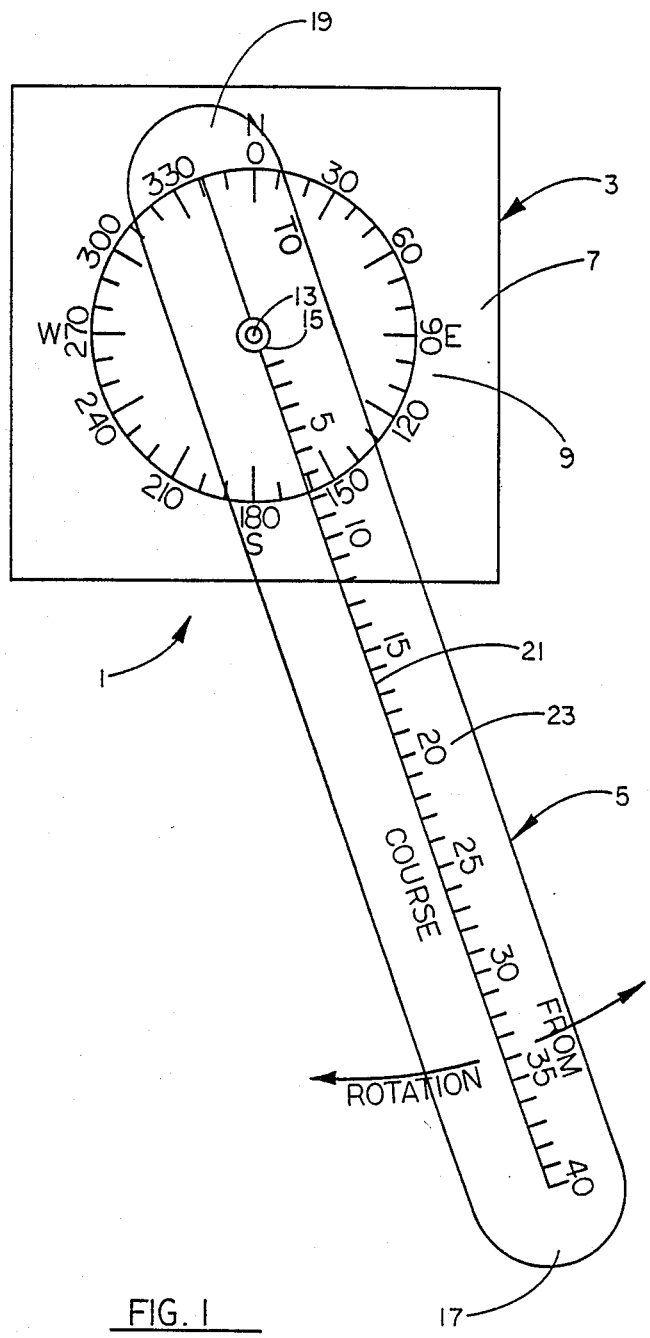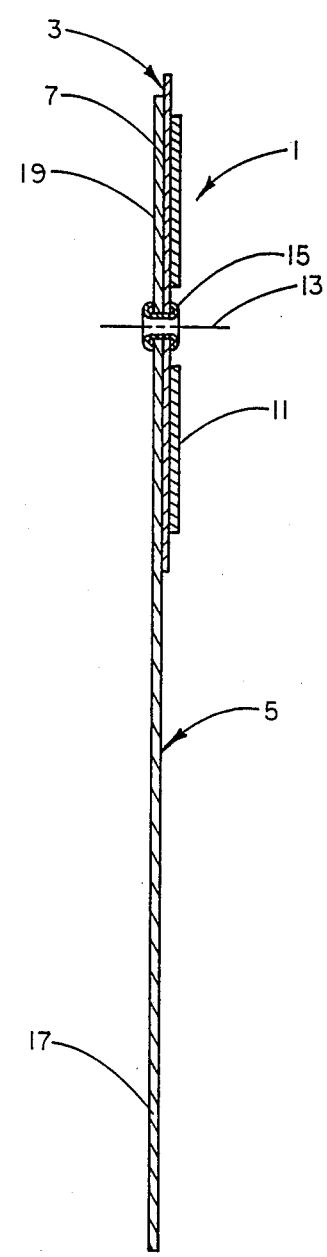
FIG. 1
FIG. 2

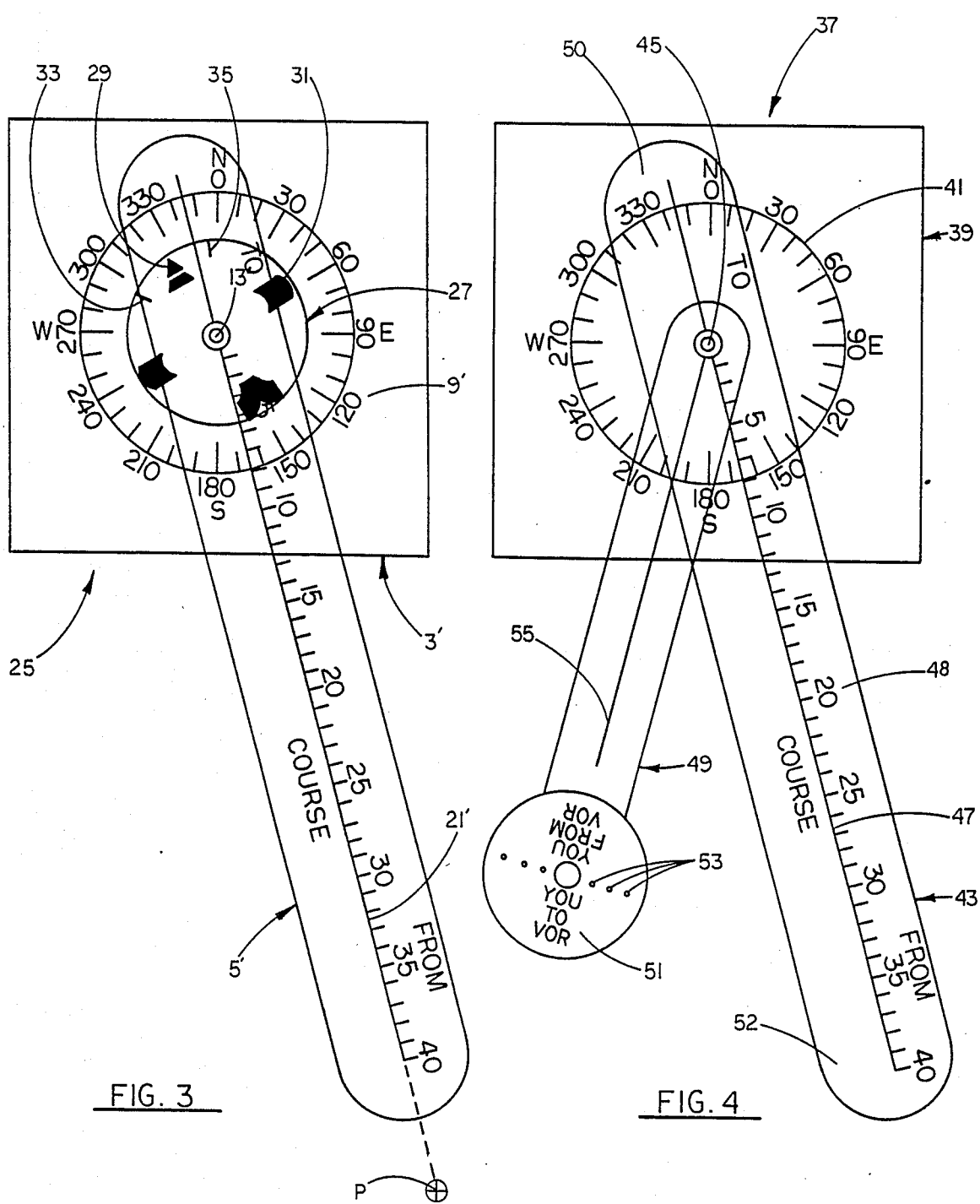

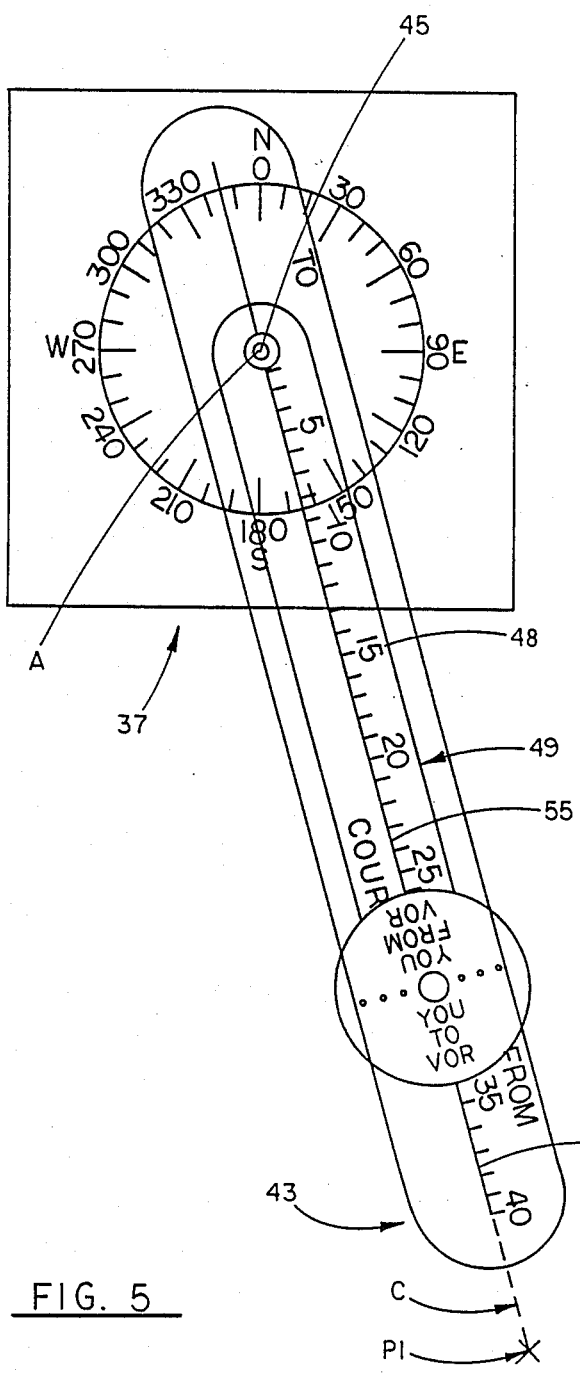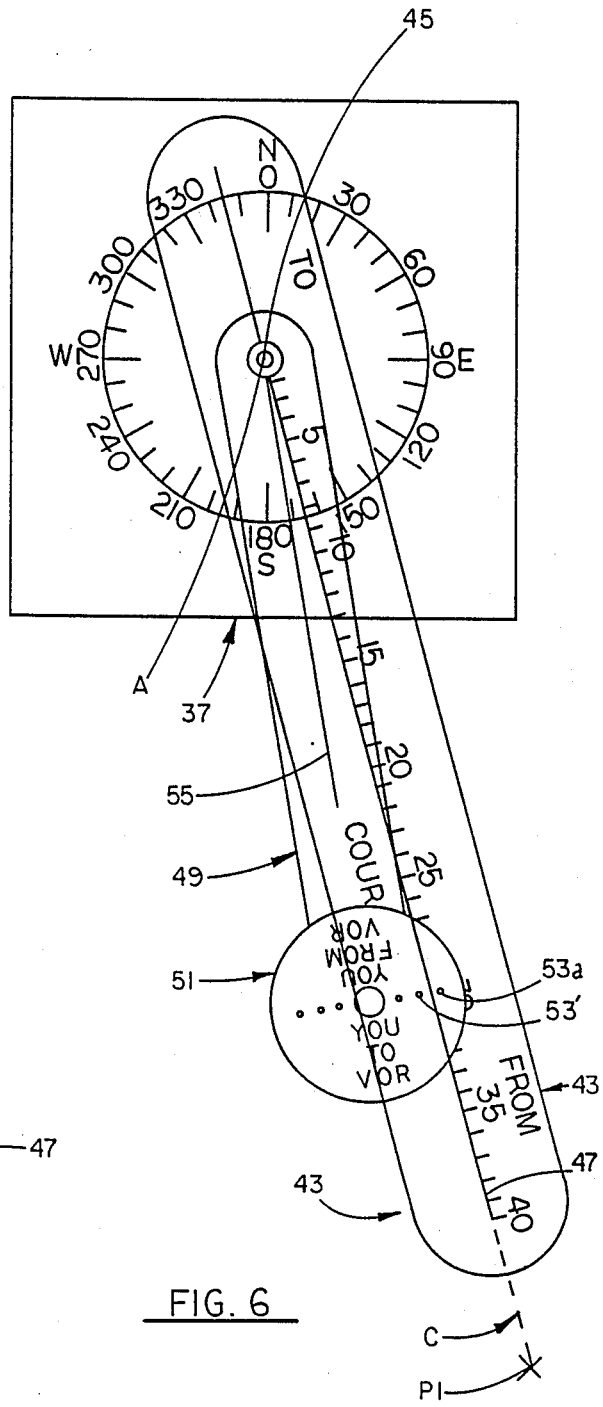

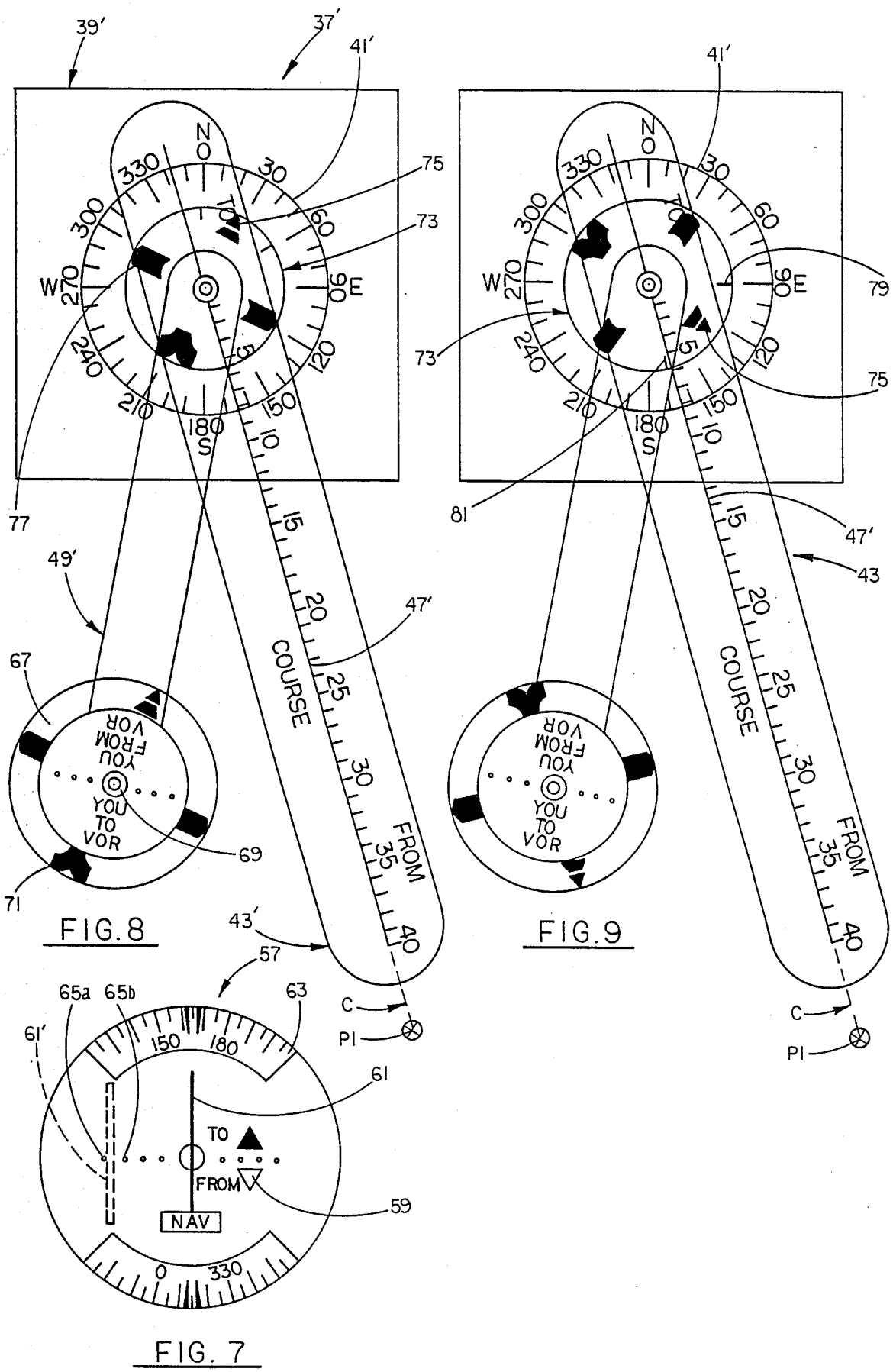

AERONAUTIC CHART REMOVABLY ATTACHABLE COURSE AND POSITION LOCATOR

RELATED APPLICATION

This application is a continuation-in-part of my copending U.S. patent application Ser. No. 903,394 filed on Sept. 2, 1986 now abandoned.

BACKGROUND OF THE INVENTION

1. Field of the Invention. This invention pertains to navigation, and more particularly to apparatus that facilitates aircraft navigation.

2. Description of the Prior Art. Numerous types of equipment have been developed to assist pilots navigate their aircraft. Hardware such as compasses, variable omni-directional radio range transmitters and receivers (VOR), non-directional beacon (NDB) radio transmitters and receivers, automatic direction finders (ADF), and distance measuring equipment (DME) are in widespread use. Aeronautic charts are commonly used. It is also known to correlate actual flying variables such as position, heading, and distance with aeronautic charts by means of relatively small hand held instruments. Examples of such instruments are disclosed in U.S. Pat. Nos. 2,736,096; 2,996,242; 3,059,339; 3,303,568; 3,690,009; 3,813,783; 3,855,706; 4,095,342; and Great Britain Pat. No. 381,613. U.S. Pat. No. 2,085,059 describes an instrument especially useful for navigating boats. Another instrument is marketed under the trademark Super Plotter by the Dorcliff Company of Placerville, Calif. The devices of most of the foregoing patents employ a compass rose having a central axis for locating over a desired point on an aeronautical chart, usually a point of departure or destination. Various combinations of arms are pivotable about the compass rose central axis. Indicia are usually inscribed on the compass rose and arms for displaying information representing navigational parameters.

The navigational instruments mentioned above are intended primarily for use by pilots of small airplanes. However, in such applications, the known instruments suffer several important disadvantages. Those disadvantages include the relatively rigid material from which the instruments are made. A common material is a clear plastic that, when considered alone, is relatively flexible. However, when used with a chart on the pilot's lap in a cramped cockpit of a small airplane, the material of the prior instruments acquires a rigidity that precludes easy handling and manipulation. Another handicap of prior instruments is that they lack convenient means for releasably attaching them to a chart. To be effective, such attachment and release must be done with one hand, leaving the other hand free for the pilot to control his airplane. Fasteners such as tacks and pins are mentioned in the prior art, but such fasteners are entirely impractical for use in a small aircraft. It is known to adhere instruments to a backing surface with individual pieces of adhesive tape, but that method is also unsatisfactory in flying situations, as it requires the use of two hands. Because of the lack of a suitable way to fasten existing navigational instruments to charts, it is very difficult and sometimes impossible for a pilot to manipulate the instruments with one hand. Similarly, it s virtually impossible for the pilot to manipulate two instruments on a chart so as to enable him to navigate by triangulation.

There is no equipment presently available that deals effectively with identifying on a chart an aircraft's position relative to NDB radio transmitters without requiring the pilot to perform mental arithmetic to deduce magnetic bearings to or from the NDB transmitter. Different shortcuts and methods are routinely taught to assist pilots to perform the required mental arithmetic, but no device or instrument has been developed that can both eliminate the mental mathematics and simultaneously show the pilot his location directly on a chart. Similarly, there is no equipment presently available that effectively identifies directly on a chart the effects of crosswind on the course of an aircraft flying directly to or from an NDB radio transmitter.

An additional shortcoming of known navigational aids is that they are designed for use by persons already skilled at navigation. On the other hand, students and others who are inexperienced in actual navigation are unable to successfully and reliably use the prior instruments to visualize their positions and headings. Such limited usefulness is partially caused by the lack of suitable teaching aids included among the prior navigational instruments, and partially by the inconvenient arrangement of the navigational indicia printed on prior instruments.

Thus, a need exists for a navigational instrument that is useful to experienced and student pilots under actual flight conditions.

SUMMARY OF THE INVENTION

In accordance with the present invention, an aeronautic chart removably attachable course and position locator is provided that enables a pilot to conveniently manage the accurate navigation of his aircraft. This is accomplished by apparatus that includes an assembly of components of a transparent and supple material with at least one component being releasably attachable to an aeronautic chart.

The course and position locator comprises a base of very thin, supple, and transparent material. On one surface of the base is imprinted a compass rose. The second base surface is coated with a releasable pressure sensitive adhesive. At the center of the compass rose is rotatably attached an elongated course indicator arm, which is also made of the supple transparent material. The course indicator arm is rotatable through 360 degrees. A longitudinal centerline extends along the course indicator arm and through the compass rose central axis. The course indicator arm is longer on one side of the compass rose central axis than on the other side thereof. A mileage scale is imprinted on the longer end of the indicator arm. The indicator arm longer end is also imprinted with the word "FROM". The word "TO" is imprinted on the indicator arm shorter end.

In use, the course and position indicator of the present invention readily bends as the pilot of a small airplane uses it in conjunction with an aeronautic chart placed on his lap. The central axis of the base compass rose is placed over a desired point on the chart, which may be a departure or destination point or a radio navigation transmitter. The base is positioned such that the north of the compass rose is aligned with magnetic north on the chart. The magnetic course to or from the chart point under the compass rose central axis (such as an airport or a VOR transmitter) is determined by rotating the course indicator arm to cross or point toward a selected second point on the chart. The course from the airport or VOR transmitter to the second chart point is read on the side of the course indicator arm labeled "FROM". The course to the airport or VOR transmitter from the second chart point is read on the side of the course indicator arm labeled "TO". The words "TO" and "FROM" immediately and clearly indicate to the pilot the course he must follow to reach the destination point from the departure point. This feature coincides in function with the "TO" and "FROM" markers of standard aircraft VOR receivers and thus serves as a teaching aid for student pilots and as a helpful reminder for experienced pilots.

A modification of the course and position locator permits a pilot in flight to see on an aeronautic chart the aircraft's heading as well as its course. The modification comprises a heading indicator disk rotatably joined to the central axis of the base compass rose. The heading indicator disk has a radial arrowhead or similar marking. By known methods, taking crosswinds, magnetic declination and compass deviation into account, the aircraft's required heading to fly a desired course is determined for the particular flying conditions. The heading indicator disk arrowhead is then radially aligned so as to indicate the proper heading on the base compass rose. The heading indicator disk arrowhead serves as a reminder to the pilot of the true heading he must take. Alternately, while in flight the pilot can refer to the aircraft's magnetic compass or directional gyroscope and then align the arrowhead mark on the heading indicator disk to point to the actual heading of the aircraft on the base compass rose, which is necessary to compensate for wind drift, magnetic declination, and compass deviation. These procedures help the pilot quickly visualize on the chart, instead of in the pilot's mind, the wind drift, magnetic declination, and compass deviation of the particular heading. These procedures are particularly useful to pilots out of visual contact with ground reference points such as in night flight or flight in or above clouds.

When used with VOR navigational equipment the course and position locator of the present invention advantageously includes a pair of radial course intercept lines on the heading indicator disk. The intercept lines represent the normal recommended maximum deviation from the aircraft's actual heading that the pilot should make to return to the original course as determined by the VOR equipment, should the aircraft stray from the desired VOR course because of bad weather or other reasons.

The course and position locator can be repeatedly removed and re-attached to an aeronautic chart by means of the releasable adhesive, thereby freeing the pilot from having to hold the locator on the chart. The ability to be removably attached to the chart permits the locator to be easily moved from one point to another on the chart as needed, and eliminates the need for continued re-alignment or holding of the locator on the chart with the pilot's hands, such as other course and position devices require.

Two of the course and position locators of the present invention can be used with a single hand by a pilot in flight to locate the position of the aircraft by means of simple triangulation using the azimuth (or course) from two VHF omni-directional range (VOR) navigation transmitters or from two non-directional beacon (NDB) radio transmitters. Three locators can be used with a single hand in combination as a system to locate the aircraft's position and to fly a course to or from airports or other points even though those points do not have navigation radio facilities. This is done by first using two of the locators to locate the position of the aircraft by means of triangulation from two off-course VOR or NDB transmitters. The central axis of the base compass rose of the third locator is placed over the desired chart point (aligning the compass rose with north on the chart). The course indicator arm of the third locator is rotated until it is over the aircraft's position on the chart. The course indicator arm of the third locator then shows the magnetic course to as well as from the desired point. The mileage scale on the course indicator arm of the third locator functions as distance measuring equipment (DME) to indicate the distance from the aircraft's position to the desired point.

The course and position indicator of the present invention is admirably suited for teaching novice pilots navigation by means of VOR or NDB equipment. As a teaching tool, one modification of the invention includes a second supple and transparent course indicator arm rotatably joined to the first arm and to the base at the central axis of the base central rose. The second arm has a longitudinal centerline imprinted thereon that passes through the compass rose central axis. Imprinted on the free end of the second arm are a series of dots, circles, or short lines arrayed along a line perpendicular to the second arm longitudinal centerline. The dots or short lines simulate the scale markings on the VOR receiver dial face in the aircraft cockpit and thus simulate a VOR dial face itself. The combination of the course indicator arm and the simulated VOR dial face permits the course indicator arm to represent not only the course as set by the VOR equipment, but also to act as a simulated course deviation indicator (CDI) on the simulated VOR dial face, thereby indicating to the pilot whether a given VOR radial is to the left or right of the aircraft. In addition, heading indicator disks can be rotatably attached to the center of the simulated VOR dial face and to the central axis of the base compass rose. The two heading indicator disks permit a student pilot to visualize the aircraft's heading as well as its position relative to the VOR radial.

Another embodiment of the present invention permits a pilot in flight to see on an aeronautic chart the aircraft's heading relative to (as well as the magnetic azimuth to or from) a non-directional beacon (NDB) by using standard automatic direction finding (ADF) equipment. Two disks are concentrically and rotatably attached to the free end of the course indicator arm. Both disks are imprinted with compass dial faces. The top dial face disk also has a printed heading mark radially aligned with the zero degree marking of a compass dial face thereon. The top disk simulates a standard aircraft ADF dial face on which the printed zero degree mark is always the front of the aircraft.

To identify the aircraft heading relative to (and magnetic azimuth to or from) the NDB transmitter while in flight, the pilot attaches the base to the aeronautic chart with the compass rose central axis located over the NDB point on the chart and with the compass rose dial face aligned to north on the chart. The pilot then notes the aircraft's heading by observing the aircraft's magnetic compass or directional gyroscope. The top dial face disk on the end of the course indicator arm is then rotated so that its heading mark is aligned with the aircraft's heading as indicated on the compass dial face of the bottom disk. Next the pilot notes the azimuth to the NDB relative to the front of the aircraft as shown by the ADF arrow on the aircraft's ADF dial. The course indicator arm is then rotated and the bottom concentric dial face disk is turned until the bottom dial face is aligned with north. Simultaneously, the course indicator arm is rotated until it intersects the compass dial face on the upper disk at the NDB reading relative to the front of the aircraft. This procedure displays on the aeronautic chart and position locator the magnetic azimuth to and from the NDB as well as displaying the aircraft's heading. Because of the releasable adhesive on the back surface of the base, this procedure can be accomplished with one hand.

The above described modification permits a pilot in flight to locate the position of the aircraft in relation to two NDB transmitters. By identifying the azimuth from each of the two NDB transmitters to the aircraft, the aircraft's position is shown on the chart where the two azimuths meet by means of simple triangulation. This operation is similar to that described above when two of the locators are used with two VOR transmitters.

Other aims, benefits, and features of the invention will become apparent to those skilled in the art upon reading the detailed description of the invention.

BRIEF DESCRIPTION OF THE DRAWINGS

FIG. 1 is a top view of the course and position locator of the present invention.

FIG. 2 is a longitudinal cross sectional view of the course and position locator of FIG. 1.

FIG. 3 is a top view of a modified course and position locator of the present invention.

FIG. 4 is a top view of a course and position locator suitable for teaching pilots to navigate using VOR equipment.

FIG. 5 is a top view of the course and position locator of FIG. 4 in use under certain navigational conditions.

FIG. 6 is a view similar to FIG. 5, but showing the course and position locator in use under different navigational conditions.

FIG. 7 is a simplified front view of the face of a VOR dial face in an aircraft cockpit.

FIG. 8 is a view similar to FIG. 4, but showing a modified embodiment of the teaching course and position locator thereof.

FIG. 9 is a partial view similar to FIG. 8, but showing the course and position locator thereof in a position corresponding with certain flight conditions.

DETAILED DESCRIPTION OF THE INVENTION

Figures 10, 11:
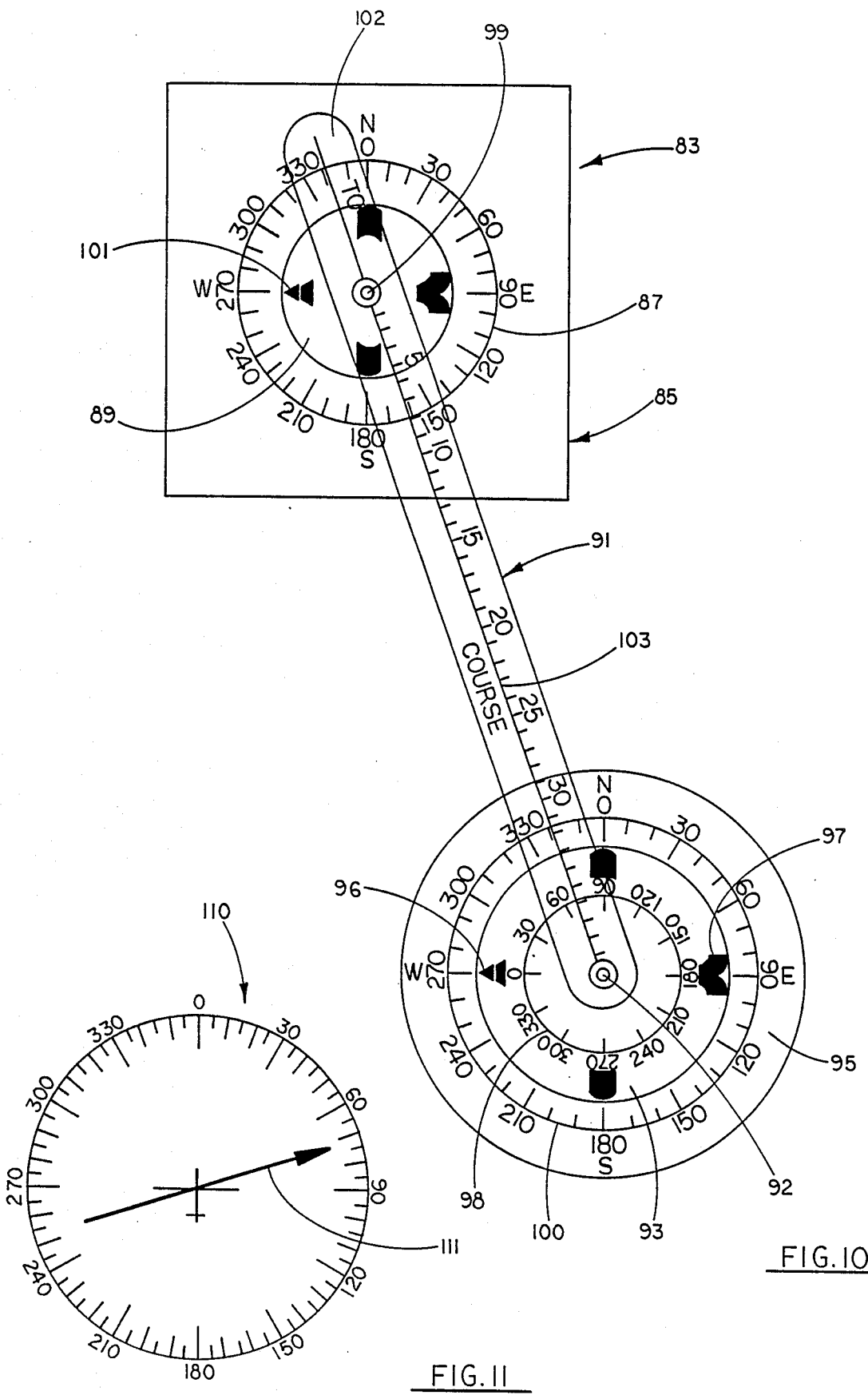
FIG. 10 is a top view of a modified course and position locator useful for navigation by means of non-directional beacons.
FIG. 11 is a simplified view of the face of an automatic direction finder (ADF) dial face in an aircraft cockpit.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Referring to FIGS. 1 and 2, an aeronautic chart removably attachable course and position locator 1 is illustrated that includes the present invention. The course and position locator is especially useful for managing the navigation of small airplanes, but it will be understood that the invention is not limited to aircraft applications.

The course and position locator 1 comprises a base member 3 and an elongated arm 5. Both the base 1 and the arm 5 are made from a very thin and supple transparent material. A preferred material is a polymer or acetate film having a thickness of approximately 0.005 inches to 0.010 inches. The dimensions of the base and arm may vary, depending on the application of the course and position locator to a particular aeronautic chart with which it is used. I have found that a square base of approximately 10 centimeters on a side and an overall arm length of approximately 24 centimeters works very well with aeronautic charts normally used by pilots of small aircraft.

The base 3 has an upper surface 7 on which is imprinted indicia representing a compass rose 9. To the base bottom surface is bonded a thin layer 11 of a releasable pressure sensitive adhesive. The releasable adhesive 11 need not cover the entire area of the base bottom surface.

The arm 5 is attached to the base 3 for rotation about the central axis 13 of the compass rose 9. Attachment is preferably by means of a hollow grommet 15. The arm is designed to function as a course indicator arm. For that purpose, it has a relatively long first end 17 and a relatively short arm 19. A longitudinal centerline 21 passes through the compass rose central axis 13. A mileage scale 23 is imprinted along the longitudinal centerline 21 and has the same scale as the aeronautic chart with which the course and position locator 1 is used. Prominently imprinted on the course indicator arm near the end of the long end 17 is the word "FROM". The word "TO" is prominently imprinted on the arm short end 19.

To use the course and position locator 1, the central axis 13 of the compass rose 9 is aligned with a desired point on an aeronautic chart, such as the point to or from which flight is to take place. The zero degree or north bearing of the compass rose is aligned with north on the chart. The base 3 is then pressed against the chart, such that the adhesive 11 retains the base in place on the chart. The intersections of the course indicator arm longitudinal centerline 21 with the compass rose 9 on the underlying base indicates courses of flight in degrees. The proper direction of the course is quickly and correctly indicated by the prominently displayed words "TO" and "FROM". Flying toward the chart point under the central axis 13 indicates that the course at the intersection of the compass rose and the arm short end 19 is to be followed because flight to the central axis 13 is desired. Flying away from the chart point under the central axis indicates that the course at the intersection of the long arm 17 and the compass rose is to be followed because flight from the central axis 13 is desired.

Because of the adhesive 11 on the bottom surface of the base 3, the course and position locator 1 remains in place on the aeronautic chart without attention from the pilot. Further, the supple nature of the base and course indicator arm 5 enables the locator to readily bend without damage or disturbing its general placement on the chart. Those features are especially important and convenient to pilots of small aircraft, wherein the pilot navigates by a chart held on his lap or in his free hand.

When used with VHF omni-directional range (VOR) navigation radio equipment, the course and position locator 1 indicates to the pilot the course he must set on the VOR dial in the aircraft instrument panel. As is known, VOR stations transmit 360 distinct courses both to and from the VOR transmitter station. The locator improves a pilot's use of VOR navigation equipment. That is because the locator permits the pilot of an aircraft in flight to see on an aeronautic chart the direction to or from a VOR transmitter by rotating the course indicator arm 5 to the proper VOR radial or the reciprocal of that radial. Because the locator is attached to the aeronautic chart while in use, the course to or from a VOR transmitter can be repeatedly identified using only one finger or thumb when it is necessary to adjust the course indicator arm, with no need to use other fingers to hold the locator to the chart.

Figure 12:
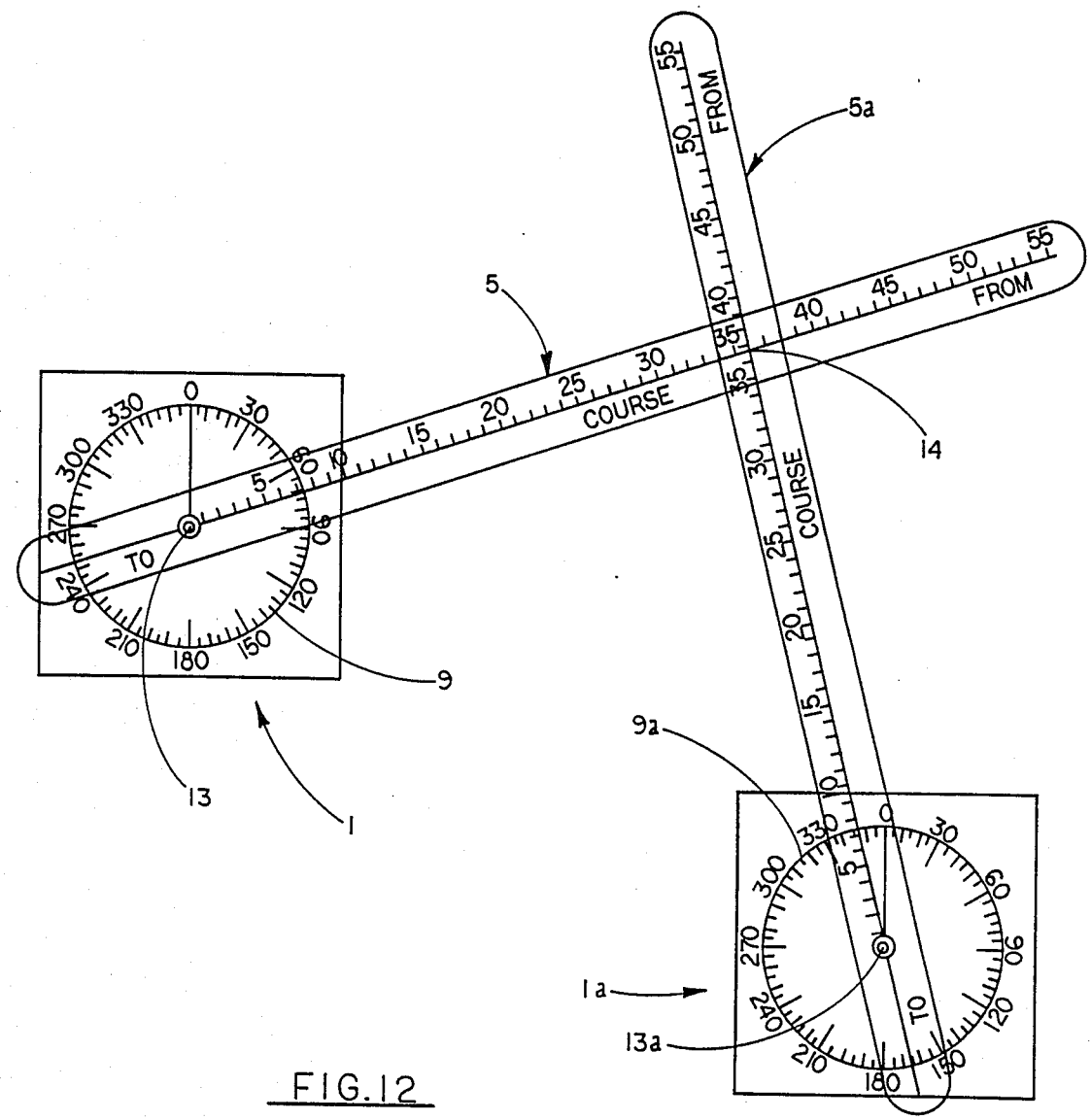
FIG. 12 is a top view of two course and position locators of FIG. 1 arranged to show their use to locate aircraft position by triangulation.

As shown in FIG. 12, two course and position locators 1 and 1a can be used in combination with two VOR transmitters to enable a pilot to navigate by triangulation. This is accomplished by placing the central axes 13 and 13a of the compass roses 9 and 9a of the two locators 1 and 1a over aeronautic chart points representing the locations of the two respective VOR transmitters. The course indicator arms 5 and 5a are rotated to match the courses (radial or reciprocal) indicated by the VOR instruments in the aircraft cockpit. The intersection 14 of the two course indicator arms represents the position of the aircraft. Because the bases 3 and 3a of both locators are attached to the chart, the pilot is able to accurately navigate his aircraft by triangulation using only one hand. The attached locators are not subject to the large errors or estimations experienced when using other navigational devices because of turbulence, vibrations, or other disturbance normally encountered while flying an aircraft.

Figure 13:
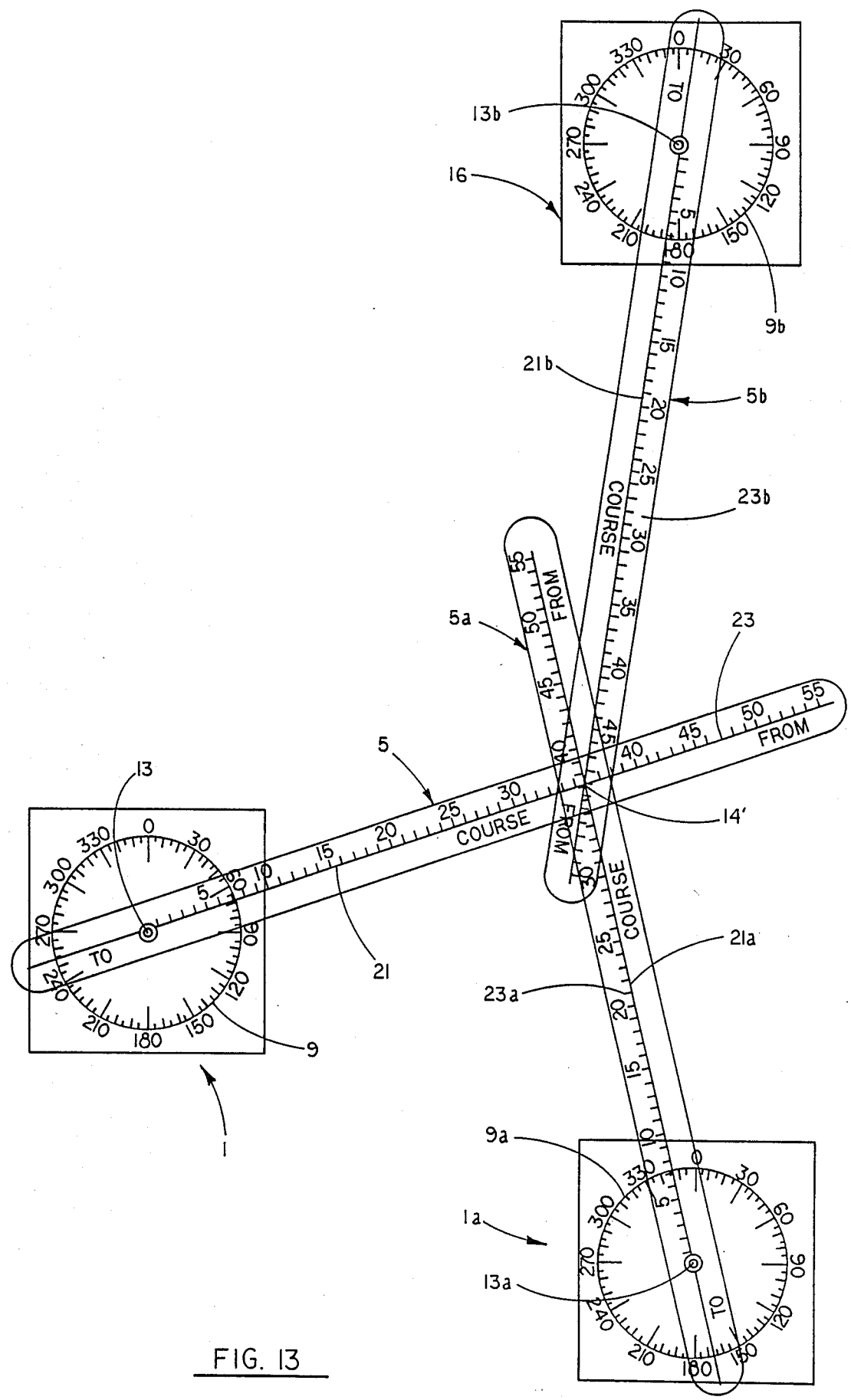

The course and position locator 1 of the present invention can be used to navigate an aircraft to a destination that does not have any navigation radio facilities. For that purpose, the central axes 13 and 13a of two locators 1 and 1a, respectively, are placed on an aeronautic chart over respective points that do have VOR transmitters, as is shown in FIG. 13. The aircraft position is found by triangulation as described previously with respect to FIG. 12. The central axis 13b of a third locator 1b is placed on the chart over the desired destination point. The course intersection arm 5b of the third locator 1b is rotated until the longitudinal center line 21b thereof is over the aircraft's position as shown by intersection 14' in FIG. 13. The intersections of the longitudinal centerline 21b on the third course indicator arm 5b and the compass rose 9b of the third indicator 1b shows the required course. The mileage scale 23b on the course indicator arm 5b indicates the distance from the aircraft's present position at 14' to the destination point at 13b. Because of the releasably adhesive 11, the pilot cam readily manipulate three locators, even with one hand in a cramped cockpit.

Turning to FIG. 3, a modified course and position locator 25 is shown. The course and position locator 25 is generally similar to the locator 1 described previously with respect to FIGS. 1 and 2, but the locator 25 includes a heading indicator disk 27. The heading indicator disk 27 is made of the same transparent supple material as the base 3' and course indicator arm 5'. The heading indicator disk is rotatably attached, along with the course indicator arm 5', to the central axis 13' of the base central rose 9'. A heading mark 29 is imprinted on the periphery of the heading indicator disk. By rotating the heading indicator disk, the heading mark 29 is radially alignable with any of the bearings on the compass rose 9'. If desired, indicia 31 representing the wings, bow, and tail of an airplane can be imprinted on the heading indicator disk. The locator 25 is used in a manner similar to that of locator 1, but the heading indicator disk 27 provides additional features that aid the pilot to manage his aircraft. With the locator 25 attached to an aeronautic chart, the heading indicator disk can be rotated on the base 3' such that the heading mark 29 indicates the straight ahead direction or heading of the aircraft. Under many flying conditions, the aircraft heading is not parallel to the course as defined by the longitudinal center line 21' (compass radial) of the course indicator arm 5'. The pilot uses the heading mark 29 to indicate on the compass rose 9' the correction necessary to maintain a straight course in spite of such external influences as cross winds. The heading indicator disk also helps the pilot visualize the aircraft heading relative to the course along the course indicator arm and also relative to the aeronautic chart.

When used with VOR navigation equipment, the pilot can use the heading indicator disk 27 to return to a desired VOR radial after the aircraft has strayed from it. To assist the pilot to efficiently return his aircraft to a desired VOR radial, the heading indicator disk is further imprinted with a pair of radial intercept lines 33 and 35. Preferably, the intercept lines are angularly spaced approximately 30 degrees on each side of the heading mark 29. The pilot uses the intercept lines 33 and 35 to determine the maximum left or right heading correction that should be undertaken to intersect the VOR course radial represented by the course arm centerline 21'. For example, in FIG. 3, it will be assumed that the desired course for flying from a point P to a point represented by the central axis 13' of the compass rose 9' is along longitudinal centerline 21', which is along a heading of approximately 348 degrees. It will further be assumed that the aircraft has strayed to the right of the radial 21', such that a new heading west of the 348 degree course must be followed to return to that course. The intercept line 35, when it contacts the radial line 21', indicates to the pilot that he should limit his new direction to a heading of approximately 320 degrees. In that manner, the pilot is able to quickly set and visualize the effect of his new heading. The maximum recommended radial intercept angle of 30 degrees has great practical importance. That is because any VOR radial intercept angle in excess of 90 degrees results in a phenomenon known as "reverse sensing." When reverse sensing occurs, the aircraft's VOR dial indicates exactly the opposite of the desired navigational information. With a maximum radial intercept of 30 degrees, the danger of reverse sensing is minimized while still enabling the pilot to efficiently return to his proper course.

Further in accordance with the present invention, the course and position locator is suitable as an efficient and convenient tool for teaching aircraft navigation to student pilots. Looking at FIG. 4, a teaching course and position locator 37 is depicted. The course and position locator 37 comprises a base 39. Imprinted on one surface of the base 39 is a compass rose 41. To the bottom surface of the base is bonded a releasable pressure sensitive adhesive, not illustrated. A course indicator arm 43 is rotatably attached to the base 39 at the central axis 45 of the compass rose 41. Imprinted on the course indicator arm 43 is a longitudinal centerline 47 and a mileage scale 48. The word "TO" is imprinted at the short end 50 of the course indicator arm 43. The word "FROM" is imprinted at the long end 52 of the course indicator arm 43. Preferably, the word "COURSE" is imprinted along the course indicator arm approximately at the midpoint of the arm. Also rotatably attached to the compass rose central axis 45 is a second arm 49. The free end of the second arm 49 is formed with a circular portion 51. Imprinted on the circular portion 51 are a series of dots 53 that are aligned perpendicular to the second arm longitudinal centerline 55. The dots 53 preferably pass through the center of the second arm circular portion 51. Also imprinted on the circular portion are the words "YOU TO VOR", which are placed between the dots and the free end of the arm. The words "YOU FROM VOR" are imprinted on the circular portion between the dots and the compass rose central axis 45 and are preferably imprinted in a direction upside down from the words "YOU TO VOR" and such that the bottoms of the letters of the words "YOU FROM VOR" are toward the compass rose central axis 45.

The use of the course and position locator 37 as a teaching tool is as follows. In FIG. 5, it will be assumed that a pilot wishes to fly along a course C from a point A on an aeronautic chart having a VOR transmitter under the compass rose central axis 45 to a point P1. A course C of approximately 165 degrees is therefore proper, and that course is set on the VOR dial face 57 shown in FIG. 7. Since the aircraft is flying away from the point with the VOR transmitter, the FROM flag 59 appears (white triangle) on the VOR dial face 57 of FIG. 7. As long as the aircraft remains on the course of approximately 165 degrees, the course deviation needle (CDI) needle 61 remains centered in the dial face and is colinear with the 165 degree mark on the top of the dial scale 63 of FIG. 7. In that situation, the pilot swings the second arm 49 of the locator 37 such that the longitudinal centerline 55 thereof is colinear with the longitudinal center line 47 of the course indicator arm 43, as is shown in FIG. 5. For clarity, a portion of the mileage scale 48 is omitted from FIG. 5.

It will be assumed that because of wind drift or other reasons, the aircraft strays to the right of the desired course on the flight to point P1 from the point represented by the central axis 45, FIG. 5. In that case, the CDI needle 61 on the VOR dial face 57, FIG. 7, swings to the left relative to the dial face scale markings 65, as shown by the phantom line 61'. Even a novice pilot recognizes that he is no longer on the desired course. However, a student pilot is much less confident of his new position relative to the desired course, i.e., he does not know which way he must fly the aircraft to return to the desired course along the 165 degree VOR radial. That navigational problem is quickly and easily solved with the locator 37, FIGS. 5 and 6. Because the pilot is flying from the VOR transmitter at point A, he aligns the course position locator 37 so that he can read the "YOU FROM VOR" side of the circular portion 51 on the second arm 49. He swings the arm 49 about the central axis 45 until the longitudinal centerline 47 of the course indicator arm 43 passes through the dots 53 on the left side of the second arm longitudinal centerline 55 in the same manner as the CDI needle 61' passes through the left side of the scale markings 65 on the VOR dial face 57 in the cockpit (FIG. 7). In the example shown, the CDI needle passes between markings 65a and 65b. Therefore, the second arm 49 is swung such that the longitudinal centerline 47 of the course indicator arm 43 passes between the dots 53a and 53b, FIG. 6. The imprinted circular portion 51 at the end of the second arm 49 thus functions as a simulated VOR dial face. By means of the centerline 55 of the second arm 49, the pilot learns immediately that the actual course is approximately 170 degrees instead of the desired course of 165 degrees. Consequently, the pilot is able to relate both the aircraft position and course relative to an aeronautic chart, i.e., the aircraft is presently to the right of the desired VOR radial between points A and P1. He further knows that he must turn his aircraft to the left to return to the course C.

Note that to easily understand this sample flight problem, FIG. 6 should be turned upside down. Likewise, flight TO or FROM a VOR is normally best accomplished by orienting the aeronautic chart so that the left or right movements of the CDI needle correspond to the actual location of the desired VOR course radial as the aircraft deviates off the desired VOR radial flight course. Because the words "YOU TO VOR" and "YOU FROM VOR" are printed upside down with respect to each other, the pilot using the invention is compelled to orient his aeronautic chart in the proper direction so as to effectively use VOR navigation equipment.

To further assist a student to learn to manage the navigation of his aircraft, the course and position locator 37 of FIGS. 4–6 may be provided with one or two aircraft heading indicator disks. In FIG. 8, a modified course and position locator 37' is shown in which a first heading indicator disk 67 is rotatably attached to the free end of the second arm 49' by a grommet 69. Imprinted on the heading indicator disk 67 is the outline of an airplane 71. The heading indicator disk 67 aids the pilot to visualize the position of the aircraft relative to the desired course represented by the longitudinal centerline 47' of the course indicator arm 43', as described previously in connection with the locator 37 of FIGS. 4–6.

To assist the student pilot determine a proper heading for returning to the desired course after straying from it, the course and position locator 37' of FIG. 8 is provided with a second heading indicator disk 73. The heading indicator disk 73 is rotatably attached to the base 39' at the center of the compass rose 41'. Imprinted on the second heading indicator disk 73 is a radial forward heading mark 75 that is radially alignable with any of the bearings on the compass rose 41'. If desired, the second heading indicator disk 73 may further be imprinted with the wings, tail, and bow outline 77 of an airplane. In practice, continuing the previous example but using FIG. 9, the heading indicator disk 73 is rotated such that the heading mark 75 is pointed to the left of the desired course which is along longitudinal centerline 47'. Radial intercept lines 79 and 81 that are approximately 30 degrees on both sides of the heading mark 75 help the pilot set the limits of his intercept heading back toward the desired course C. The intercept heading is found by rotating the heading indicator disk 73 until the right intercept line 81 of FIG. 9 is aligned with the longitudinal centerline 47' of the course indicator arm 43'. The reading on the compass rose 41' by use of the heading indicator disk forward heading mark 75 indicates the maximum deviation that the pilot should fly to return to his desired course. In the example, the forward heading mark 75 shows that a heading of 135 degrees is the maximum heading the pilot should follow to efficiently return to the desired course C without encountering the risk of reverse sensing described previously.

It is a feature of the present invention that it can be used to assist a pilot manage the navigation of his plane using non-directional beacons. Turning to FIG. 10, a course and position locator 83 has a base 85 with a center compass rose 87 imprinted on the top surface thereof. To the bottom surface of the base 85 is bonded a releasable pressure sensitive adhesive that is not illustrated but that is substantially identical to the adhesive 11 described in connection with the course and position locator 1 of Figs. 1 and 2. To the central axis 99 of the compass rose 87 is rotatably attached a heading indicator disk 89 and an elongated course indicator arm 91. The heading indicator disk 89 and the course indicator arm 91 are substantially as described previously with respect to locator 1, with the heading indicator disk having a heading mark 101 and the course indicator arm having the word "TO" imprinted on the shorter end 102 thereof. To the distal end of the course indicator arm 91 are rotatably joined, as by a grommet 92, two concentric compass dial faces 93 and 95. The components of the course and position locator 83 are made of the same supple transparent material as described previously.

The smaller, upper compass dial face 93 represents the dial face of known standard automatic direction finding (ADF) equipment in the aircraft such as shown as dial face 110 in Fig. 11. The dial face 93 has a heading mark 96 that is radially aligned with the zero degree bearing on the compass rose 98 of that dial face, and that is alignable with any of the bearings on the compass rose 100 of the lower compass dial face 95. Preferably, the dial face 93 has the partial plan view of an airplane 97 imprinted on it, with the bow of the airplane coinciding with the heading mark 96.

To use the course and position locator 83 to identify the aircraft's heading and azimuth relative to a non-directional beacon (NDB), the compass rose central axis 99 of the base 85 is centered over the point on an aeronautic chart representing the location of the NDB. North on the base compass rose 87 is aligned with north on the chart. The base is then attached by its adhesive backing to the chart. The pilot notes the aircraft's heading by observing the aircraft's magnetic compass or directional gyroscope. The heading mark 101 of the aircraft heading indicator disk 89 is rotated to show the aircraft's heading on the stationary compass rose 87. With the dial face 95 aligned with north on the chart, the pilot rotates the top dial face 93 until the heading mark 96 thereon is radially aligned with the heading of the aircraft as shown on the bottom dial face 95 and on the base compass rose 87. Then the pilot notes the azimuth to the NDB relative to the front of the aircraft as shown by the needle of the aircraft's ADF dial, such as by needle 111 of the dial face 110 in FIG. 11. In the example of FIG. 11, the ADF dial needle 111 points to an azimuth of 70 degrees. The pilot clasps the top and bottom dial faces 93 and 95 with one hand and rotates the course indicator arm 91 of the course and position around the stationary compass rose 87 such that the bottom dial face remains aligned with north on the chart. The course indicator arm is rotated until the longitudinal centerline 103 thereof intersects the compass dial of the top dial face 93 at the same heading as is displayed by the aircraft ADF dial, such as 70 degrees. This procedure finds the magnetic azimuth of the aircraft to the NDB transmitter point on the chart under the base central axis 99. The magnetic azimuth is the intersection of the compass indicator arm centerline 103 with the base compass rose 87 reading in the TO direction on the course indicator arm. Further, this procedure is accomplished without requiring the pilot to perform the arithmetic of adding or subtracting aircraft's compass heading to or from the radial shown on the aircraft's NDB receiver (the ADF dial face). This feature is particularly significant while flying under instrument flying conditions, because it is then that the pilot is usually required to mentally add or subtract the compass heading to or from the radial displayed on the ADF dial face in order to navigate. Navigation by triangulation off of NDB radio transmitters is thus greatly simplified.

For the example shown in FIG. 10, it is assumed that the aircraft is flying on a heading due west or 270 degrees. It is further assumed that the aircraft ADF needle points to a direction of 70 degrees on the ADF dial face. The base central axis 99 is attached to the aeronautic chart over the point that represents the NDB of interest. The heading indicator disk heading mark 101 and the dial face heading mark 96 are aligned with the 270 degree bearing on the base 85 and lower dial face 95, respectively. With the dial face 95 continually aligned north and the upper dial face heading mark 96 always aligned to the 270 degree bearing on the lower dial face, the course indicator arm 91 is rotated until the longitudinal centerline 103 thereof intersects the 70 degree bearing on the upper dial face 93. In that condition, the course indicator arm indicates that the magnetic azimuth from the aircraft to the NDB is on a course of 340 degrees. The word "TO" on the course indicator arm short end 102 enables the pilot to quickly and easily visualize, identify, and fly the proper course he must take to or from the NDB. The locator 83 further displays the aircraft heading in three places: on the base compass rose 87, on the lower dial face 95, and on the aeronautic chart upon which the course and position locator has been placed.

A unique function of the course and position locator 83 of FIG. 10 is that it can be used to enable a pilot to locate the aircraft's position by magnetic azimuth triangulation using two of the course and position locators 83 and two NDB transmitters. Triangulation is accomplished by placing the center rose central axes 99 of the two bases 85 over the respective aeronautic chart points representing the two NDB transmitters. The readings to the two NDB transmitters are taken from the aircraft ADF dial. The upper and lower dial faces 93 and 95 are aligned as previously described. The course indicator arms 91 are rotated until the respective intersections of their longitudinal centerlines 103 and the ADF dial readings are obtained. The intersection of the two course indicator arms represent the position of the aircraft relative to the NDBs and to the chart as found by triangulation and without requiring mental arithmetic.

The course and position locator 83 shown in FIG. 10 permits a pilot to identify on an aeronautic chart, and thus correct for, any aircraft drift caused by crosswind while flying directly to or from an NDB transmitter. For example, in FIG. 10, if a strong wind was blowing from the east, a pilot who simply flew a course of 340 degrees would not arrive at the NDB located at the center axis 99 of the base 85. However, by using the position locator 83, the pilot, upon noting that his aircraft ADF dial was slowly moving to the right, i.e., degrees increasing, could see on the chart that he was being blown to the west and that he must correct his approach angle to the NDB transmitter to point more toward the east, such as 350 degrees instead of 340 degrees, to offset for the easterly wind.

Thus, it is apparent that there has been provided, in accordance with the invention, an aeronautic chart removably attachable course and position locator that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. An aeronautic course removably attachable course and position locator comprising:
   a. a base made from a transparent supple material and having opposed first and second surfaces, the first surface being imprinted with indicia representing a 360 degree compass rose with a central axis, the base second surface being at least partially coated with a releasable pressure sensitive adhesive for self-adhering to an underlying surface; and
   b. an elongated course indicator arm made of transparent supple material, the course indicator arm being rotatably attached near one end thereof to the central axis of the base compass rose so as to create a short arm end and a long arm end, the arm being imprinted with indicia comprising a longitudinal centerline therealong passing through the base compass rose central axis, a mileage scale along the arm longitudinal centerline, the sole word "TO" on the arm adjacent the short end thereof, and the sole word "FROM" adjacent the long end thereof,
   so that the course and position locator base by using only one hand is releasably attachable to and easily bends with the underlying surface and is operable thereon by using only one hand.

2. The course and position locator of claim 1 further comprising a heading indicator disk made of a transparent supple material and rotatably attached to the base and the course indicator arm at the central axis of the base compass rose, the heading indicator disk being imprinted solely with indicia representing a heading mark, the heading indicator disk being rotatable to radially align the heading mark thereof with any of the bearing on the base compass rose,
   so that the heading indicator disk easily bends with the base on the underlying surface.

3. The course and position locator of claim 1 further comprising a heading indicator disk made of a transparent supple material and rotatably attached to the base and the course indicator arm at the central axis of the base compass rose, the heading indicator disk being imprinted with indicia representing a heading mark and with indicia representing the bow, tail, and wings of an airplane with the airplane bow indicia being radially aligned with the heading indicator disk heading mark and with the airplane bow and tail indicia being located on opposite sides of the central axis of the base compass rose and the airplane wings indicia being located on opposite sides of the central axis of the base compass rose,
   so that the heading indicator disk is rotatable to radially align the heading mark thereon with any of the bearings on the base compass rose and the heading disk easily bends with the base on the underlying surface.

4. The course and position locator of claim 1 further comprising a heading indicator disk made of a transparent supple material and rotatably attached to the base and the course indicator arm at the central axis of the base compass rose, the heading indicator disk being imprinted with indicia representing a heading mark and with indicia comprising at least one interceptor line angularly spaced at a predetermined distance from the heading indicator disk heading mark, the heading indicator disk being rotatable to radially align the heading mark thereon with any of the bearings on the base compass rose, the interceptor line being radially alignable with second bearing on the base compass rose when the heading indicator disk heading mark is radially aligned with a first predetermined bearing on the base compass rose,
   so that the heading disk easily bends with the base on the underlying surface.

5. An aeronautic course and position locator comprising:
   a. a base made from a transparent supple material and having opposed first and second surfaces, the first surface being imprinted with indicia representing a 360 degree compass rose with a central axis, the base second surface being at least partially coated with a releasable pressure sensitive adhesive;
   b. an elongated course indicator arm made of transparent supple material, the course indicator arm being rotatably attached near one end thereof to the central axis of the base compass rose so as to create a short arm end and a long arm end, the arm being imprinted with indicia comprising a longitudinal centerline therealong passing through the base compass rose central axis, a mileage scale along the arm longitudinal centerline, the sole word "TO" on the arm adjacent the short end thereof, and the sole word "FROM" adjacent the long end thereof; and
   c. a second elongated arm made of a transparent supple material rotatably attached to the base at the central axis of the compass rose thereon, the second arm being imprinted with a longitudinal centerline therealong passing through the base compass rose central axis, the second arm having a free end imprinted with indicia comprising a plurality of dots arrayed in a line generally perpendicular to the second arm longitudinal centerline and generally symmetrical thereabout, the words "YOU TO VOR" placed between the dots and the free end of the second arm, and the words "YOU FROM VOR" placed between the dots and the base compass rose central axis,
   so that the second arm can be rotated relative to the course indicator arm such that the longitudinal centerline of the course indicator arm passes adjacent selected ones of the array of dots on the second arm.

6. The course and position locator of claim 5 further comprising a heading indicator disk made from a transparent supple material and being rotatably attached to the free end of the second arm, the heading indicator disk being imprinted with indicia corresponding to the outline of an airplane.

7. The course and position locator of claim 5 further comprising a heading indicator disk made from a transparent supple material and being rotatably attached to the base and course indicator arm at the central axis of the base compass rose, the heading indicator disk being imprinted with indicia corresponding to a heading mark, the heading indicator disk being rotatable on the base so as to enable the heading mark to be radially aligned with any of the bearings on the base compass rose.

8. The course and position locator of claim 7 wherein the heading indicator disk is further imprinted with indicia corresponding to a pair of intercept lines radially spaced at predetermined distances on both sides of the heading mark,
   so that the intercept lines are alignable with predetermined second bearings on the base compass rose when the heading mark is aligned with a selected first bearing on the base compass rose.

9. An aeronautic course and position locator comprising:
   a. a base made from a transparent supple material and having opposed first and second surfaces, the first surface being imprinted with indicia representing a 360 degree compass rose with a central axis, the base second surface being at least partially coated with a releasable pressure sensitive adhesive;
   b. an elongated course indicator arm made of transparent supple material, the course indicator arm being rotatably attached near one end thereof to the central axis of the base compass rose so as to create a short arm end and a long arm end, the arm being imprinted with indicia comprising a longitudinal centerline therealong passing through the base compass rose central axis, a mileage scale along the arm longitudinal centerline, the sole word "TO" on the arm adjacent the short end thereof, and the sole word "FROM" adjacent the long end thereof;
   c. a heading indicator disk made of a transparent supple material and rotatably attached to the base and the course indicator arm at the central axis of the base compass rose, the heading indicator disk being imprinted with indicia representing a heading mark, the heading indicator disk being rotatable to radially align the heading mark thereof with any of the bearing on the base compass rose;
   d. a first compass dial disk made of a transparent supple material and being rotatably attached to the long end of the course indicator arm, the first compass dial disk being imprinted with indicia corresponding to a compass dial; and
   e. a second compass dial disk made of a transparent supple material and being rotatably attached to the long end of the course indicator arm concentric with the first compass dial disk, the second compass dial disk being imprinted with indicia representing a compass dial and a heading mark, the second compass dial disk being rotatable relative to the first compass dial disk such that the heading mark on the second compass dial disk is radially alignable with any of the bearings on the first compass dial disk.

10. The course and position locator of claim 9 wherein at least one of the heading indicator disk and the second compass dial disk is further imprinted with indicia representing the outline of an airplane.

11. A tool for teaching students to navigate aircraft by VHF omni-directional range navigational radio equipment (VOR) comprising:
   a. a base made from a transparent supple material and having opposed first and second surfaces, the first surface being imprinted with indicia representing a 360 degree compass rose with a central axis, the base second surface being at least partially coated with a releasable pressure sensitive adhesive; and
   b. an elongated course indicator arm made of transparent supple material, the course indicator arm being rotatably attached near one end thereof to the central axis of the base compass rose so as to create a short arm end and a long arm end, the arm being imprinted with indicia comprising a longitudinal centerline therealong and passing through the base compass rose central axis, a mileage scale along the longitudinal centerline, the sole word "TO" adjacent the short end thereof, and the sole word "FROM" adjacent the long end thereof; and
   c. a second elongated arm made of a transparent supple material rotatably attached to the base at the central axis of the compass rose thereon, the second arm being imprinted with a longitudinal centerline therealong passing through the base compass rose central axis, the second arm having a free end imprinted with indicia comprising a plurality of dots arrayed in a line generally perpendicular to the second arm longitudinal centerline and generally symmetrical thereabout, the words "YOU TO VOR" placed between the dots and the end of the second arm, and the words "YOU FROM VOR" placed between the dots and the base compass rose central axis,
   so that the second arm can be rotated relative to the course indicator arm by using only one hand such that the longitudinal centerline of the course indicator arm is passable and viewable adjacent selected ones of the array of dots on the second arm.

12. The tool of claim 11 further comprising a heading indicator disk made from a transparent supple material and being rotatably attached to the free end of the second arm, the heading indicator disk being imprinted with indicia corresponding to the outline of an airplane.

13. The tool of claim 11 further comprising a heading indicator disk made from a transparent supple material and being rotatably attached to the base at the central axis of the compass rose thereon, the heading indicator disk being imprinted with indicia corresponding to a heading mark,
   so that the heading indicator disk may be rotated to radially align the heading mark with a selected bearing on the base compass rose.

14. The tool of claim 13 wherein the heading indicator disk is further imprinted with indicia corresponding to the outline of an airplane with the bow of the airplane coincident with the heading mark.

15. The tool of claim 13 wherein the heading indicator disk is further imprinted with indicia comprising a pair of radial intercept lines angularly spaced a predetermined distance from the heading mark,
   so that when the heading indicator disk is rotated to align the heading mark with a selected bearing on the base compass rose the intercept lines are radially aligned with respective predetermined other bearings on the base compass rose.

16. An aeronautic chart removably attachable course and position locator for navigating an aircraft by non-directional beacon equipment using only one hand comprising:
  a. a base made from a transparent supple material and having opposed first and second surfaces, the first surface being imprinted with indicia representing a 360 degree compass rose with a central axis, the base second surface being at least partially coated with a releasable pressure sensitive adhesive;
  b. an elongated course indicator arm made of transparent supple material, the course indicator arm being rotatably attached near one end thereof to the central axis of the base compass rose so as to create a short arm end and a long arm end, the arm being imprinted with indicia comprising a longitudinal centerline therealong and passing through the base compass rose central axis, a mileage scale along the longitudinal centerline, and the word "TO" adjacent the short end thereof,
  c. a first compass dial disk made of a transparent supple material and being rotatably attached to the long end of the course indicator arm, the first compass dial disk being imprinted with indicia corresponding to a compass dial; and
  d. a second compass dial disk made of a transparent supple material and being rotatably attached to the long end of the course indicator arm concentric with the first compass dial disk, the second compass dial disk being imprinted with indicia representing a compass dial and a heading mark, the second compass dial disk being rotatable relative to the first compass dial disk such that the heading mark on the second compass dial disk is radially alignable with any of the bearings on the first compass dial disk.

17. The course and position locator of claim 16 further comprising a heading indicator disk made from a transparent supple material and being rotatably attached to the base at the central axis of the compass rose thereon, the heading indicator disk being imprinted with a heading mark,
  so that rotating the heading indicator disk enables the heading mark to be radially aligned with selected bearings on the base compass rose.

18. The course and position locator of claim 17 wherein at least one of the heading indicator disk and the second compass dial disk is further imprinted with indicia comprising the outline of an airplane with the bow of the airplane being radially aligned with the heading mark.

19. In combination with an aeronautic chart, an aeronautic chart removably attachable course and position locator for assisting a pilot to navigate an aircraft comprising:
  a. a base made from a transparent supple material and having opposed first and second surfaces, the first surface being imprinted with indicia representing a 360 degree compass rose with a central axis, the base second surface being at least partially coated with a releasable pressure sensitive adhesive for releasably self-adhering the base second surface to the chart with the base compass rose central axis placed over a variably selectable point on the chart; and
  b. an elongated course indicator arm made of transparent supple material, the course indicator arm being rotatably attached near one end thereof to the central axis of the base compass rose so as to create a short arm end and a long arm end, the arm being imprinted with indicia comprising a longitudinal centerline therealong and passing through the base compass rose central axis, a mileage scale along the longitudinal centerline, the sole word "TO" adjacent the arm short end, and the sole word "FROM" adjacent the arm long end,
  so that the pilot can easily bend the base and arm and releasably attach the base to the chart using only one hand to thereby enable the pilot to manage the navigation of the aircraft with only one hand.

20. The combination of claim 19 wherein a second course and position locator is releasably attached to the aeronautic chart by using only one hand with the base compass rose central axis thereof placed over a second variably selectable point on the chart,
  so that the pilot can manage the navigation on the aircraft by triangulation using only one hand by means of variably selectable points on the chart.

21. The combination of claim 20 wherein a third course and position locator is releasably attached to the aeronautic chart by using only one hand with the base compass rose central axis thereof placed over a third variably point on the chart,
  so that the pilot can manipulate the first and second course and position locator to determine the aircraft position by triangulation and the third course and position locator to determine the aircraft course from the aircraft position to the third selected point by using only one hand and by using points on the chart that are variably selectable by the pilot.

22. In combination with an aeronautic chart marked with points representing the locations of VHF omnidirectional range navigation radial (VOR) transmitters, an aeronautic chart removably attachable course and position locator for teaching a student to navigate an aircraft using VOR equipment comprising:
  a. a base made from a transparent supple material and having opposed first and second surfaces, the first surface being imprinted with indicia representing a 360 degree compass rose with a central axis, the base second surface being at least partially coated with a releasable pressure sensitive adhesive for releasably adhering the base to the chart with the base compass rose central axis placed over a selected point on the chart representing a VOR transmitter;
  b. an elongated course indicator arm made of transparent supple material, the course indicator arm being rotatably attached near one end thereof to the central axis of the base compass rose to create a short arm end and a long arm end, the arm being imprinted with indicia comprising a longitudinal centerline therealong and passing through the base compass rose central axis, a mileage scale along the longitudinal centerline, the sole word "TO" adjacent the arm short end, and the sole word "FROM" adjacent the arm long end, the course indicator arm being rotatable to locate the longitudinal centerline thereof over a desired course on the aeronautic chart representative of a flight course that intersects the VOR transmitter; and
  c. a second elongated arm made of a transparent supple material rotatably attached to the base at the central axis of the compass rose thereon, the second arm being imprinted with a longitudinal centerline therealong passing through the base compass rose central axis, the second arm having a free end imprinted with indicia representing a VOR dial face, the words "YOU TO VOR" placed on the simulated VOR dial face adjacent the free end of the second arm, and the words "YOU FROM VOR" placed on the simulated VOR dial face remote from the second arm free end, the second arm being rotatable by using only one hand about the base compass rose central axis such that the course indicator arm longitudinal centerline is passable and viewable through the second arm simulated VOR dial face in simulation of the operation of VOR equipment in an aircraft when the aircraft strays from the desired course.

23. The combination of claim 22 further comprising a heading indicator disk imprinted with indicia representing an airplane outline and being rotatably attached to the second arm simulated VOR dial face to enable the student to visualize the position and heading of the aircraft when it strays from the desired course as indicated by the course indicator arm longitudinal centerline.

24. The combination of claim 22 further comprising a heading indicator disk imprinted with a heading mark and being rotatably attached to the base at the compass rose central axis, the heading indicator disk being rotatable to radially align the heading mark with a selected bearing on the base compass rose in accordance with a corrected aircraft course subsequent to straying from the desired course as indicated by the course indicator arm longitudinal centerline.

25. The combination of claim 24 wherein the heading indicator disk is further imprinted with two intercept lines angularly spaced a predetermined distance from the heading mark, the intercept lines being aligned with predetermined bearings on the base compass rose when the heading mark is aligned with a selected compass rose bearing to thereby display the maximum corrected aircraft course to return to the desired course subsequent to straying therefrom.

* * * * *